(12) United States Patent
Scharf-Katz et al.

(10) Patent No.: US 8,423,070 B2
(45) Date of Patent: Apr. 16, 2013

(54) METHOD AND SYSTEM TO MODEL TCP THROUGHPUT, ASSESS POWER CONTROL MEASURES, AND COMPENSATE FOR FADING AND PATH LOSS, FOR HIGHLY MOBILE BROADBAND SYSTEMS

(76) Inventors: Volkmar Scharf-Katz, Bethesda, MD (US); Jatinder Pal Singh, Stanford, CA (US); Nicholas Bambos, Hillsborough, CA (US)

( * ) Notice: Subject to any disclaimer, the term of this patent is extended or adjusted under 35 U.S.C. 154(b) by 1447 days.

(21) Appl. No.: 10/943,557

(22) Filed: Sep. 17, 2004

(65) Prior Publication Data

US 2006/0063554 A1    Mar. 23, 2006

(51) Int. Cl.
*H04B 7/00*    (2006.01)

(52) U.S. Cl.
USPC .......... 455/522; 455/445; 370/208; 370/235; 370/318

(58) Field of Classification Search ........... 370/208, 370/231, 235, 252, 318, 465; 455/445, 522
See application file for complete search history.

(56) References Cited

U.S. PATENT DOCUMENTS

| | | | |
|---|---|---|---|
| 6,151,508 A | 11/2000 | Kim et al. | |
| 6,219,561 B1 * | 4/2001 | Raleigh | 455/561 |
| 6,628,956 B2 | 9/2003 | Bark et al. | |
| 6,735,448 B1 * | 5/2004 | Krishnamurthy et al. | 455/522 |
| 6,915,128 B1 * | 7/2005 | Oh | 455/424 |
| 7,013,257 B1 * | 3/2006 | Nolan et al. | 703/28 |
| 2003/0076785 A1 * | 4/2003 | Purpura | 370/252 |
| 2005/0025040 A1 * | 2/2005 | Tang et al. | 370/208 |
| 2005/0025093 A1 * | 2/2005 | Yun et al. | 370/328 |
| 2005/0059417 A1 * | 3/2005 | Zhang et al. | 455/515 |

OTHER PUBLICATIONS

Padhye et al., "Modeling Tcp Throughput: a Simple Model and its Empirical Validation," Acm Sigcomm, 1998 (12 pp.).*
Goldsmith and Varaiya, "Capacity of fading channels with side information," IEEE Transactions on Information Theory, pp. 1986-1992, Nov. 1997.
Chua and Goldsmith, "Variable-rate variable power MQAM for fading channels," IEEE Vehicular Technology Conference, 1996.
Bakakrishman et al., "A comparison of mechanisms for improving TCP performance over wireless links," IEEE/ACM Transactions on Networking, 1998.
Xylomenous and Poluzos, "TCP and UDP performance over a wireless lan," IEEE INFOCOM, 1999.
Azauz et al., "MAITE: A scheme for improving the performance of TCP over wireless channels," IEEE Vehicular Technology Conference, 2001.

(Continued)

*Primary Examiner* — Olumide T Ajibade Akonai
*Assistant Examiner* — Jaime Holliday
(74) *Attorney, Agent, or Firm* — Kenyon & Kenyon LLP

(57) ABSTRACT

A method and system for determining an optimal throughput of a communications channel in a highly mobile wireless environment, which includes selecting power control measures, determining a throughput of the communications channel for each of the selected power control measures using a throughput model of the communications channel and the selected power control measure, wherein the throughput model is based on a probability of a packet error averaged over a packet fade, and wherein the probability of the packet error averaged over the packet fade is a function of the selected power control measure, and determining the optimal throughput as a maximum one of the throughputs determined for each of the selected power control measures.

23 Claims, 12 Drawing Sheets

OTHER PUBLICATIONS

Altman et al., A stochastic model of TCP/IP with stationary random losses, ACM SIGCOMM, pp. 231-242, 2000.

Zorzi et al., "Throughput and energy performance of TCP on a wideband CDMA air interface," Wireless Communications and Mobile Computing, vol. 2(1), Feb. 2002.

Y.Y. Kim and S. Li, "Capturing important statistics of a fading/shadowing channel for network performance analysis," IEEE Journal on Selected Areas in Communications, vol. 17, No. 5, pp. 888-901, May 1999.

* cited by examiner

METHOD AND SYSTEM TO MODEL TCP THROUGHPUT, ASSESS POWER CONTROL MEASURES, AND COMPENSATE FOR FADING AND PATH LOSS, FOR HIGHLY MOBILE BROADBAND SYSTEMS

FIELD OF THE INVENTION

The present invention relates to a method and system to model TCP throughput, assess power control measures, select an optimal control measure, and compensate for fading and path loss conditions, for highly mobile broadband systems.

BACKGROUND

Broadband communications in the wireless environment may present certain challenges, such as, for example, varying channel conditions and fading, which may limit the data rate achievable on a wireless channel. A highly mobile system, such as, for example, a fast moving train may present further challenges, including, for example, fast fading channel conditions.

Attempts to counter the adverse wireless channel conditions may include transmission power control measures. In particular, it is believed that adapting the transmitter power to channel variations may help achieve increased data rates. In this regard, power control measures for a single-user flat-fading channel, have been discussed, for example, in Goldsmith and Varaiya, "Capacity of fading channels with channel side information," IEEE Transactions on Information Theory, pp. 1986-1992, November 1997, and Chua and Goldsmith, "Variable-rate variable power MQAM for fading channels," IEEE Vehicular Technology Conference, 1996, both of which are incorporated by reference as to such measures and their implementation.

Another challenge besetting wireless support for running broadband applications is the severe impact that varying channel conditions may have on data communication protocols adapted to reliable wireless conditions, including, for example, the widely deployed transport layer protocol TCP (Transmission Control Protocol), which is useful for operation over reliable media. In particular, invocation of congestion control mechanisms due to wireless channel errors may adversely affect TCP performance. Various alleviation measures have been proposed and appraised in the literature to handle the problems that TCP faces in a wireless scenario. For example, the proposals include hiding any non-congestion losses from the sender or making the sender aware and capable of differentiating between packet loss due to channel errors and those due to congestion. Several proposals along these lines have been discussed, for example, in Bakakrishman et al., "A comparison of Mechanisms for Improving TCP Performance over Wireless Links," IEEE/ACM Transactions on Networking, 1998, Xylomenous and Poluzos, "TCP and UDP Performance over a Wireless Lan," IEEE INFOCOM, 1999, and Arauz et al., "MAITE: A Scheme for Improving the Performance of TCP over Wireless Channels," IEEE Vehicular Technology Conference, 2001.

Certain network operators may wish to deploy broadband wireless access in a high-mobility environment, such as within high-speed trains in Germany, for example. Delivering wireless computing and communication services, such as, for example, broadband Internet access, to the passengers of high-speed trains may be a challenging task. The ICE trains in Germany, for example, may reach speeds of up to 300 km/h and may pass through tunnels or along rather tall trees. Transmission techniques, such as, for example, satellite links, which require line of sight, may not be feasible for such an endeavor. In particular, the presence of obstacles along the railway routes, such as trees, buildings, bridges, and tunnels, may cause shadowing and/or fading of the satellite link. Moreover, any prospective technology to provide broadband wireless access to high-speed trains may need to serve potentially hundreds of trains concurrently all over Germany. All relevant railroad tracks may be electrified, energy being picked up by two engines at the front and rear of the trains from a catenary wire above the tracks. It is believed that several alternatives like wireless LANs, GPRS, or a combination thereof, are being considered or surveyed to provide broadband wireless access in such a scenario. If TCP is used to carry most or at least a significant portion of the Internet traffic, appropriate tuning of the protocol to the relevant wireless channel conditions may be desired.

Attempts have been made to model TCP performance with power adaptation. A stochastic model of TCP for a generic stationary loss process is discussed, for example, in Altman et al., "A Stochastic Model of TCP/IP with Stationary Random Losses," ACM SIGCOMM, pp. 231-242, 2000. In the wireless scenario, however, the loss process statistics required by the model may not be easy to model and evaluate, especially due to multipath fading. A TCP throughput expression for wideband CDMA is presented, for example, in Zorzi et al., "Throughput and Energy Performance of TCP on a Wideband CDMA Air Interface," Wireless Communications and Mobile Computing, Volume 2(1), February 2002. However, this throughput prediction is not based on TCP dynamics modeling but is heuristics-based and hence illustrates TCP behavior in the considered environment.

SUMMARY OF THE INVENTION

An exemplary method and/or exemplary embodiment of the present invention uses a model of TCP channel throughput for a highly mobile wireless communication system, such as, for example, a fast moving train. In particular, the TCP throughput is determined using the model under wireless channel path loss and fading conditions so that different power control measures may be compared with respect to the varying path loss and fade rates, and a suitable or optimal choice of power adaptation may be selected to achieve a higher TCP throughput. Accordingly, the exemplary method of the present invention may be used to enhance TCP throughput over a wireless channel by appropriately compensating for fading and/or path loss, including, for example, compensating for path loss and fading of a high-mobility system undergoing fast fading. In this regard, the interpretation of the proposed power adaptation measures may be used to make deployment decisions for wireless infrastructure along the train track.

Consequently, the exemplary method and/or exemplary embodiment of the present invention may be used to provide improved seamless broadband wireless access to passengers of high speed vehicles, including for example, passengers of high speed trains, which may be traveling, for example, at speeds of up to 300 km/hr. In this regard, the passengers may be equipped, for example, with mobile telephones, laptop computers, personal data assistants, etc. The broadband access may include, for example, Internet and/or remote intranet access, or infotainment services. The exemplary method and/or exemplary embodiment of the present invention may also provide a platform for value-added services, such as, for example, operational data, video surveillance, on-board ticketing, advertisements, and multimedia services.

According to an exemplary embodiment and/or exemplary method of the present invention, TCP throughput is modeled under high-mobility fading channel and/or path loss conditions so that TCP behavior may be assessed with underlying physical layer power adaptation measures. Adapting the power to varying channel conditions is intended to enable TCP to better cope with the conditions of a high-mobility wireless environment. Accordingly, the exemplary method and/or exemplary embodiment of the present invention may provide suitable or optimal power adaptation measures to prevent or least minimize TCP performance degradation over a wireless channel, so as to provide optimal or at least better TCP throughput performance. In particular, dynamic power adaptation may be employed as a measure to counter degradation suffered by TCP over a wireless channel.

According to an exemplary embodiment and/or exemplary method of the present invention, the TCP throughput modeling method may be used to assess the effect of power control measures on TCP performance under wireless fading conditions along the trajectory of a fast moving train so that the relative merit of different power control measures on fast fading channels may be evaluated. To counter challenges due to high-mobility, TCP throughput is evaluated with fading and path loss compensation. In particular, various fading scenarios are evaluated, including, for example, slow fading where the fade level is assumed to be constant over several TCP rounds, fast packet-transmission duration fading where the fade level is assumed to be constant over the packet transmission interval, and fast bit-transmission fading where the fade level is assumed to be constant over the bit transmission interval. Although transmission power may not be a limitation for a train, power control may be crucial to limit the interference that a train can cause when it travels through urban environments, train stations and vicinity of other trains.

An exemplary method of the present invention is directed to determining an optimal throughput of a communications channel in a highly mobile wireless environment, which includes selecting different power control measures, determining a throughput of the communications channel for each of the selected power control measures using a throughput model of the communications channel and the selected power control measure, wherein the throughput model is based on a probability of a packet error averaged over a packet fade, and wherein the probability of the packet error averaged over the packet fade is a function of the selected power control measure, and determining the optimal throughput as a maximum one of the throughputs determined for each of the selected power control measures.

Another exemplary method of the present invention is directed to determining an optimal power control measure for a communications channel in a highly mobile wireless environment, which includes selecting different power control measures, determining a throughput of the communications channel for each selected power control measure using a throughput model of the communications channel and the selected power control measure, wherein the throughput model is based on a probability of a packet error averaged over a packet fade, and wherein the probability of the packet error averaged over the packet fade is a function of the selected power control measure, determining the optimal throughput as a maximum one of the throughputs determined for each of the selected power control measures and determining the optimal power control measure based on the determined optimal throughput.

Yet another exemplary method of the present invention is directed to determining an optimal TCP throughput of a wireless communications channel between a stationary element and a mobile element, which includes comparing different power control measures under an adverse condition of the wireless communications channel using a model of TCP throughput of the wireless communications channel as a function of a probability of packet error averaged over a packet fade, and determining a power control measure to provide an optimum TCP throughput.

Still another exemplary method of the present invention is directed to modifying a TCP throughput of a wireless communications channel in a highly mobile system, which includes dynamically adapting a transmission power of the wireless communications channel to counter fading using a power control measure, which was selected based on a throughput model of the wireless communications channel that is a function of a probability of a packet error averaged over a packet fade, and compensating for a path loss in the highly mobile system using a model corresponding to the path loss along the path.

An exemplary embodiment of the present invention is directed to a highly mobile wireless communications system, which includes a first compensation arrangement to compensate a transmission power of a communications channel to counter fading using a power control measure, which was selected based on a throughput model of the wireless communications channel that is a function of a probability of a packet error averaged over a packet fade, and a second compensation arrangement to compensate for a path loss in the highly mobile wireless communications system using a model corresponding to the path loss along the path.

An example embodiment of the present invention includes a storage medium having a set of instructions residing therein, the set of instructions being executable by a processor to implement a method for performing: (a) selecting a power control measure; and (b) determining a throughput of the communications channel using a throughput model of the communications channel and the selected power control measure, wherein the throughput model is based on a probability of a packet error averaged over a packet fade, and wherein the probability of the packet error averaged over the packet fade is a function of the selected power control measure. In a further embodiment, the method further includes: (c) repeating steps (a) and (b) for another power control measure; and (d) determining an optimal throughput as a maximum one of the throughputs determined for each of the selected power control measures.

DETAILED DESCRIPTION

Figure 1A:
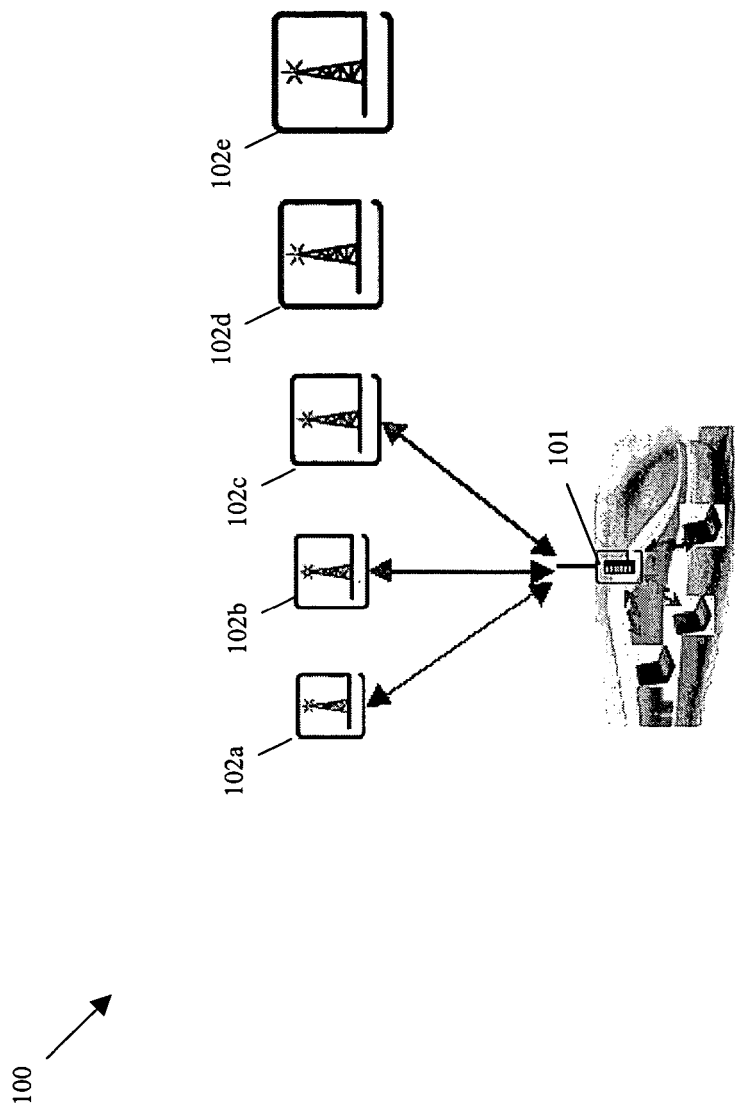
FIG. 1A shows an exemplary arrangement to provide broadband access to passengers of a high-speed train.

FIG. 1A shows an exemplary arrangement to provide broadband access to passengers of a high-speed train or other high-speed platform, in which a mobile host or gateway 101 associated with the high-speed train 110 communicates with one or more access points/base stations (AP/BSs) 102a, 102b, 102c, 102d, 102e, etc., arranged along the route of travel. In this regard, a model of the TCP channel throughput between the gateway 101 and the access points/base stations (AP/BSs) 102 may be provided. In particular, a stochastic model for congestion avoidance may be provided, which incorporates the effects of fast retransmit and a timeout mechanism.

The TCP congestion avoidance behavior is modeled in terms of rounds. A TCP round begins with the back to back transmission of a window of packets and ends on reception on an acknowledgement (ACK) for one of these packets. Packet loss may be detected either by reception at TCP sender of triple-duplicated acknowledgements or via timeouts. The former event is called a Triple Duplicate (TD) loss indication and the latter event is called a Timeout (TO) indication. A Triple Duplicate Period (TDP) is defined as the period between two successive triple duplicate loss indications. The analysis assumes a bursty loss of TCP packets, which may not be valid when packet losses are attributed to fast fading wireless channel. However, simulations performed by relaxing the bursty loss assumption show that the pattern of relative performance of different power adaptation schemes remains the same when the bursty loss assumption is relaxed.

A steady-state model of TCP throughput B, for packet error rate p and average round trip time RTT, has been expressed as follows:

$$B(p) = \begin{cases} \dfrac{\dfrac{1-p}{p} + E[W] + \hat{Q}(E[W])\dfrac{1}{1-p}}{RTT\left(\dfrac{b}{2}E[W_u]+1\right) + \hat{Q}(E[W])T_0\dfrac{f(p)}{1-p}}, & \text{if } E[W_u] < W_{max} \\ \dfrac{\dfrac{1-p}{p} + W_{max} + \hat{Q}(W_{max})\dfrac{1}{1-p}}{RTT\left(\dfrac{b}{8}W_{max} + \dfrac{1-p}{pW_{max}} + 2\right) + \hat{Q}(W_{max})T_0\dfrac{f(p)}{1-p}}, & \text{otherwise} \end{cases} \quad (1)$$

where W is the random variable representing TCP window size, $T_0$ the timeout, $W_{max}$ is the maximum window size, b represents the number of packets that are acknowledged by a received ACK, and $W_u$ is the unconstrained window size, which is dependent on the packet error rate. The term $\hat{Q}(w)$ represents the probability that a loss in a window of size w is a timeout (TO) and $f(p)$ may be as follows:

$$f(p) = 1 + p + 2p^2 + 4p^3 + 8p^4 + 16p^5 + 32p^6.$$

For example, for a speed of 300 km/h and a transmission frequency of 2.4 GHz, the channel coherence time is 1.5 ms and the transmission of a frame of size 1000 bytes at a rate of 5 Mbps requires 1.6 ms. Hence, in this instance, frames undergo independent fading. Accordingly, the steady-state model of TCP throughput is now further developed to account for a fast fading wireless channel, in which the fade is assumed to be constant over transmission duration of a packet. The required parameters for the model may be determined as follows.

If α is the first packet lost in a Triple Duplicate Period (TDP) and $\gamma_i$ is the signal-to-noise ratio (SNR) during the transmission of an $i^{th}$ packet in a TDP, then with $p(\gamma)$ as the packet error probability, $$P[\alpha = k/\gamma_1, \ldots, \gamma_k] = \left(\prod_{i=1}^{k-1}(1-p(\gamma_i))\right)p(\gamma_k).$$

Averaging over the fading distributions $f_F$ and noting that fading is independent over different packet transmission intervals, $$P[\alpha = k] = \int_{\gamma_1}\ldots\int_{\gamma_k} P[\alpha=k/\gamma_1,\ldots,\gamma_k]f_F(\gamma_1,\ldots,\gamma_k)d\gamma_1\ldots d\gamma_k$$

$$= \int_{\gamma_k} p(\gamma_k)f_{\gamma_k}(\gamma_k)d\gamma_k \prod_{i=1}^{k-1}\int_{\gamma_i}(1-p(\gamma_i))f_{\gamma_i}(\gamma_i)d\gamma_i$$

$$= (1-\overline{p})^{k-1}\overline{p}$$

The expected value E[α] is then $$\frac{1}{1-\overline{p}},$$

where $\overline{p}$ is the average packet error probability.

Next an expression for A(w,k) may be determined, which is the probability that the first k packets are acknowledged (i.e., "ACKed") in a round of w packets, given that there is a sequence of one or more losses in the round. If V is the random variable signifying the number of packets that are ACKed in a round of w packets and B is the event that there is sequence of one or more losses in the round, then:

$$P[V = k/\gamma_1,\ldots,\gamma_w] = p(\gamma_{k+1})\prod_{i=1}^{k-1}(1-p(\gamma_i))$$

$$P[B/\gamma_1,\ldots,\gamma_w] = 1 - \prod_{i=1}^{w}(1-p(\gamma_i)).$$

Averaging over the fading distributions yields:

$$P[V=k]=(1-\overline{p})^k\overline{p}$$

$$P[B]=1-(1-\overline{p})^w$$

Then A(w, k) may be evaluated as:

$$A(w, k) = P[V = k/B] = \frac{(1-\bar{p})^k \bar{p}}{1-(1-\bar{p})^w}.$$

Next, the probability C(n, m) that of the n packets sent, m are ACKed in sequence in the last round and rest of the packets, if any, are lost, may be shown to be as follows:

$$C(n, m) = \begin{cases} (1-\bar{p})^m \bar{p} & m \le n-1 \\ (1-\bar{p})^n & m = n \end{cases}.$$

The probability $\hat{Q}(w)$ that a loss in a window of size w is a timeout is as follows:

$$\hat{Q}(w) = \begin{cases} 1; \text{ if } w < 3 \\ \sum_{k=0}^{2} A(w, k) + \sum_{k=3}^{w} A(w, k) \sum_{m=0}^{2} C(k, m); o/w \end{cases},$$

which may be solved as:

$$\hat{Q}(w) = \min\left(1, \frac{(1-(1-\bar{p})^3)(1+(1-\bar{p})^3(1-(1-\bar{p})^{w-3}))}{1-(1-\bar{p})^w}\right).$$

If R is the number of packets sent during the timeout sequence $Z^{TO}$ then it may be shown that:

$$E[R] = \frac{1}{1-\bar{p}}$$

and the expected value of $Z^{TO}$ is as follows:

$$E[Z^{TO}] = T_0 \frac{1 + \bar{p} + 2\bar{p}^2 + 4\bar{p}^3 + 8\bar{p}^4 + 16\bar{p}^5 + 32\bar{p}^6}{1-\bar{p}}$$

Next, using the determined expression for E[α], the unconstrained window size may be shown to have an expected value of:

$$E[W_u] = \frac{2+b}{3b} + \sqrt{\frac{8(1-\bar{p})}{3b\bar{p}} + \left(\frac{2+b}{3b}\right)^2}.$$

Till now, the parameters Q, E[R] and E[$Z^{TO}$], E[α] and E[$W_u$] have been presented as depending on the packet error rate. Substituting the derived expressions, the resulting throughput formulation is as follows:

$$B_{pf} = \begin{cases} \dfrac{\dfrac{1-\bar{p}}{\bar{p}} + E[W] + \hat{Q}(E[W])\dfrac{1}{1-\bar{p}}}{RTT\left(\dfrac{b}{2}E[W_u] + 1\right) + \hat{Q}(E[W])T_0 \dfrac{f(\bar{p})}{1-\bar{p}}}, \text{ if } E[W_u] < W_{\max} \\ \dfrac{\dfrac{1-\bar{p}}{\bar{p}} + W_{\max} + \hat{Q}(W_{\max})\dfrac{1}{1-\bar{p}}}{RTT\left(\dfrac{b}{8}W_{\max} + \dfrac{1-\bar{p}}{\bar{p}W_{\max}} + 2\right) + \hat{Q}(W_{\max})T_0 \dfrac{f(\bar{p})}{1-\bar{p}}}, \text{ otherwise} \end{cases}, \quad (2)$$

where $\bar{p}$ is the probability of packet error averaged over the packet fade. That is, $$\bar{p} = \int_\gamma p(\gamma) f_{65}(\gamma) d\gamma \quad (3)$$

Power Adaptation to Compensate for Fading

Fast variations in channel conditions due to multipath fading may be compensated via suitable power adaptation, including, for example, water-pouring, truncated channel inversion, and logarithmic power adaptation. In this regard, all such power control measures may be subject to the average power constraint as follows:

$$\int_\gamma \frac{S(\gamma)}{\bar{S}} d\gamma = 1, \quad (4)$$

where S(γ) refers to the transmission power as a function of the signal-to-noise ratio (SNR) and $\bar{S}$ is the average power for fading.

With no power adaptation, the transmission power remains constant and is equal to the average power as follows:

$$\frac{S(\gamma)}{\bar{S}} = 1. \quad (5)$$

With water-pouring power adaptation, the transmission power to average power relationship is as follows:

$$\frac{S(\gamma)}{\bar{S}} = \begin{cases} \dfrac{1}{\gamma_0} - \dfrac{1}{\gamma} & \gamma \ge \gamma_0 \\ 0 & \gamma < \gamma_0 \end{cases}, \quad (6)$$

where $\gamma_0$ is the lower cut-off signal-to-noise (SNR).

With truncated channel inversion power adaptation, which attempts to compensate for fading over a cut off fade-depth, the power adaptation for a lower cut-off SNR $\gamma_c$ is as follows:

$$\frac{S(\gamma)}{\bar{S}} = \begin{cases} \dfrac{\sigma}{\gamma} & \gamma \ge \gamma_c \\ 0 & \gamma < \gamma_c \end{cases},$$

where σ is the constant received SNR, which is as follows:

$$\sigma = \frac{1}{\int_{\gamma_c}^{\infty} \frac{1}{\gamma} f_\gamma(\gamma) d\gamma}. \quad (7)$$

With logarithmic power adaptation, the transmitter power to average power relationship is as follows:

$$\frac{S(\gamma)}{\overline{S}} = \begin{cases} \ln\frac{\gamma_c}{\gamma} & \gamma_c < \gamma < \gamma_0 \\ 0 & \text{otherwise} \end{cases} \quad (8)$$

where $\gamma_c$, $\gamma_0$ are the lower and upper cut-off SNRs, respectively.

As discussed by Y. Y. Kim and S. Li in "Capturing Important Statistics of a Fading/Shadowing Channel for Network Performance Analysis," IEEE Journal on Selected Areas in Communications, vol. 17, no. 5, pp. 888-901, May 1999, water-pouring power adaptation may be the optimal power allocation for realization of fading channel capacity, when channel state information is known both to the sender and receiver. Water-pouring may also be used to achieve capacity on frequency-selective fading channels, as discussed, for example, by Goldsmith and Varaiya in "Capacity of Fading Channels with Channel Side Information," IEEE Transactions on Information Theory, pp. 1986-1992, November 1997. Both references are incorporated by reference as to the details of such adaptation and/or their implementation.

Power Adaptation to Compensate for Path Loss

Figure 1B:
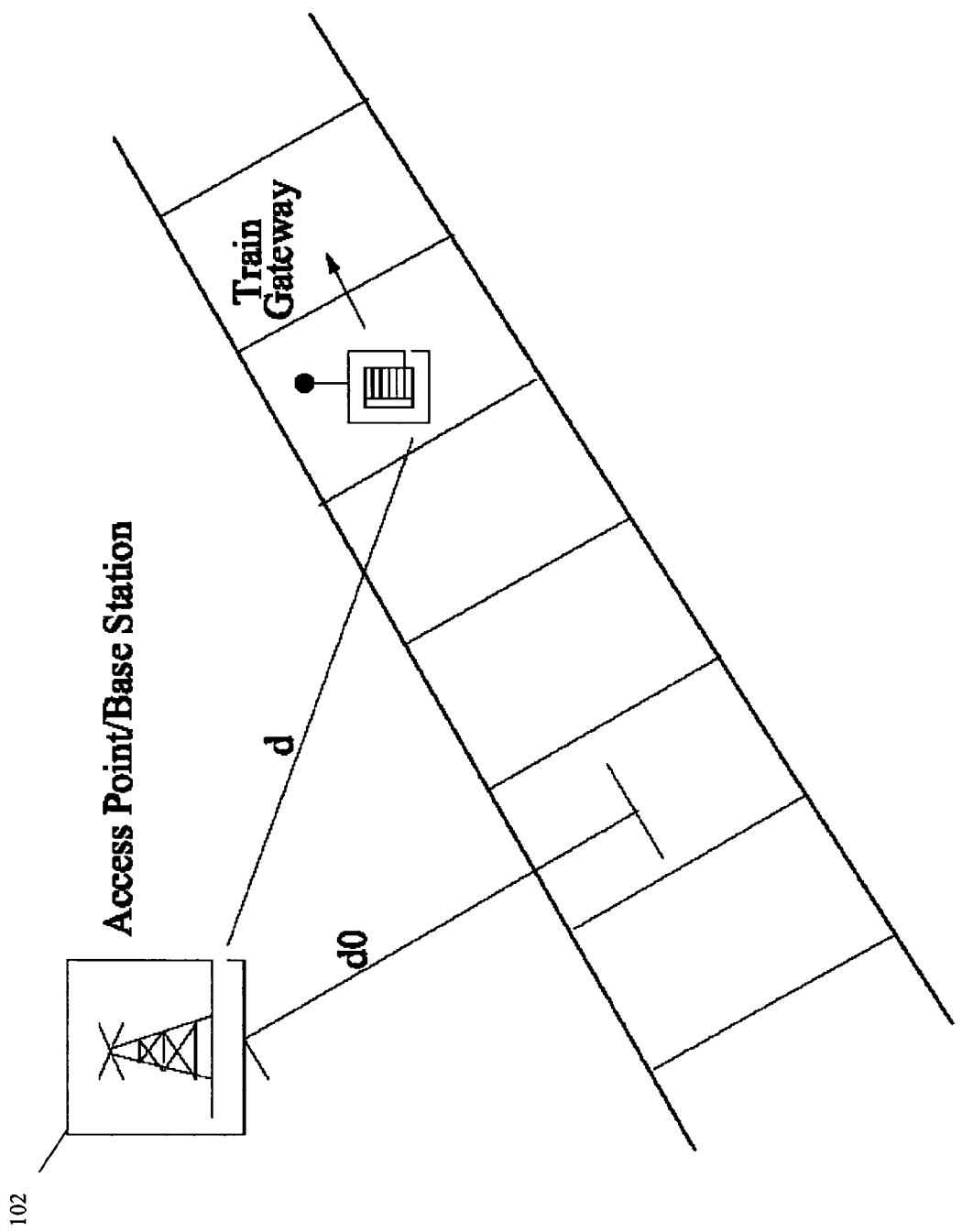
FIG. 1B shows a trajectory path of a mobile host or train gateway associated with a high-speed train, and an access point/base station (AP/BS) intended to provide communications support to the mobile host.

FIG. 1B shows a trajectory of a mobile host or gateway 101 associated with a high-speed train or other high-speed platform 110, and an access point/base station (AP/BS) 102 intended to provide communications support to the gateway 101. In this regard, the gateway 101 is arranged, for example, on top of the train, and the access point/base station (AP/BS) 102 is arranged at a distance $d_0$ along the tracks. As the gateway 101 travels along the tracks, the signal strength received by the AP/BS 102 may undergo variations. These changes in signal strength may be relatively slow vis-a-vis variations due to fading. Assuming the high-speed train is moving at a constant speed v, a path loss compensation model along the trajectory may be determined as follows.

As the train enters the coverage area of the AP/BS 102 before handing off, the path loss increases with increasing distance. Owing to the path loss along the wireless channel, the received power is proportional to the inverse of the distance raised to the path loss exponent. Accordingly, compensation for the path loss may be performed so as to maintain the received power to be constant as the train traverses the coverage area. If t=0 corresponds to the moment when the train is nearest to the AP/BS 102, then at any time t before a handoff occurs, the ratio of transmitted power levels for path loss compensation is as follows:

$$\frac{\overline{S}(t)}{\overline{S}(0)} = \left(\frac{d}{d_0}\right)^\delta, \quad (9)$$

where $\delta$ is the path loss exponent for the train-track environment. It is noted that $\overline{S}(t)$ is the average power for fast packet transmission fading, and is now a function of time t since it is being varied to compensate for the path loss. Substituting for d and denoting $\overline{S}(0)$ by $\overline{S}_m$, the average power for fast fading (that is, a model corresponding to path loss and its compensation) may be expressed as follows:

$$\overline{S}(t) = \overline{S}_m\left(1 + \left(\frac{vt}{d_0}\right)^2\right)^{\frac{\delta}{2}}. \quad (10)$$

Relative Performance of Power Control Measures Under Different Fading Conditions The following is a methodology for assessing TCP throughput for different underlying power adaptation or control measures. The assessment is for a flat-fading channel, with channel state variations attributed to fading. In determining TCP throughput, the packet loss is assumed to be due to channel errors in the wireless hop and the congestion related losses are considered to be relatively minimal. To explore the fast fading and compensation effects, the slow path loss variations may be disregarded and the average fading power S is assumed to be constant. For the channel, an Add White Gausssian Noise (AWGN) Rayleigh fading model may be used. The modulation scheme is based on a binary phase shift key (BPSK). It is also assumed that constant length TCP packets are encapsulated in physical frames and that there is no segmentation. There is no error correction coding, so that a TCP packet is in error if any of the bits of the encapsulating frame is in error. In this regard, it is assumed that error detection mechanisms are capable of identifying bit errors incurred during transmission. Hence, for a frame length of N bits, the packet error probability p and the bit error probabilities $p_{b,i}$'s may be related as follows:

$$p(\gamma) = p_E(p_b(\gamma_1), \ldots, p_b(\gamma_N))$$

$$= 1 - \prod_{i=1}^{N}(1 - p_b(\gamma_i)).$$

For an AWGN channel and BPSK modulation, the bit error probability is as follows:

$$p_b(\gamma) = Q(\sqrt{2\gamma}) \quad (12)$$

where Q denotes the Q-function (e.g., Marcum Q-Function) and the SNR of $\gamma$ follows the exponential distribution with mean $\overline{\gamma}$, as per the Rayleigh fading channel assumption, as follows:

$$f_\gamma(\gamma) = \frac{1}{\overline{\gamma}}\exp\left(-\frac{\gamma}{\overline{\gamma}}\right), \gamma \geq 0. \quad (13)$$

The following power control measures are used on which the TCP throughput behavior is assessed. All power control measures are subject to the average power constraint of:

$$\int_\gamma \frac{S(\gamma)}{\overline{S}} d\gamma = 1, \quad (14)$$

where $S(\gamma)$ refers to the transmission power as a function of the signal-to-noise ratio (SNR) and $\overline{S}$ is the average power.

The average packet error probability from equation (3) with power adaptation may be expressed as follows:

$$\bar{p} = \int_\gamma p\left(\gamma \frac{S(\gamma)}{\bar{S}}\right) f_\gamma(\gamma) d\gamma. \quad (15)$$

Since the fade remains constant over a packet, equation (15) holds for this case. Using equations (12), (13) and (15), the TCP throughput may be evaluated from equation (2) for this case, using the power adaptation measures of no power adaptation, water-pouring, truncated channel inversion, and/ or logarithmic power adaptation.

Table 1 shows the parameter values chosen for an example performance assessment.

TABLE I

PARAMETER VALUES FOR TCP THROUGHPUT ASSESSMENT

| Parameter | Value |
| --- | --- |
| b | 2 |
| $T_0$ | 3 s |
| $\gamma_c$ | 5 dB |
| N | 1500 bytes |
| $W_{max}$ | 48 |
| RTT | 250 ms |

The length of physical frame encapsulating a TCP packet, namely N, is 1500 bytes, in the example. A value of 250 ms is chosen for the average RTT, which is reasonable, for instance, for a scenario representing a TCP session with a wireless end-hop and the session extending over wireline network, and $W_{max}$ is the maximum TCP window size.

Figure 2A:
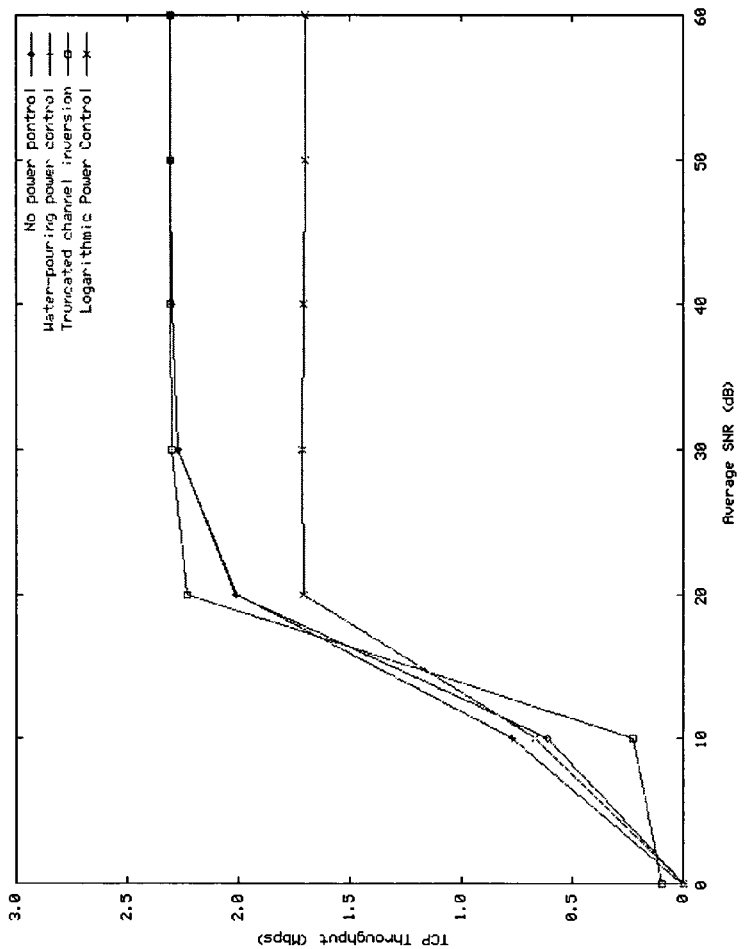
FIG. 2A shows TCP throughput as a function of signal-to-noise ratios (SNRs) for different power control measures under slow fading conditions.

FIG. 2A shows the TCP throughput as a function of signal-to-noise ratios (SNRs) for different power control/adaptation measures under slow fading conditions where the fade level is assumed to be constant over several TCP rounds. In this scenario, different power control measures may be used to determine which yields better throughput than without power control measure. The power control measure of truncated channel inversion outperforms other power control/adaptation measures for average signal-to-noise ratios (SNRs) greater than 20 dB. At low average signal-to-noise ratios (SNRs), water-pouring control/adaptation has been observed to be optimal.

Figure 2B:
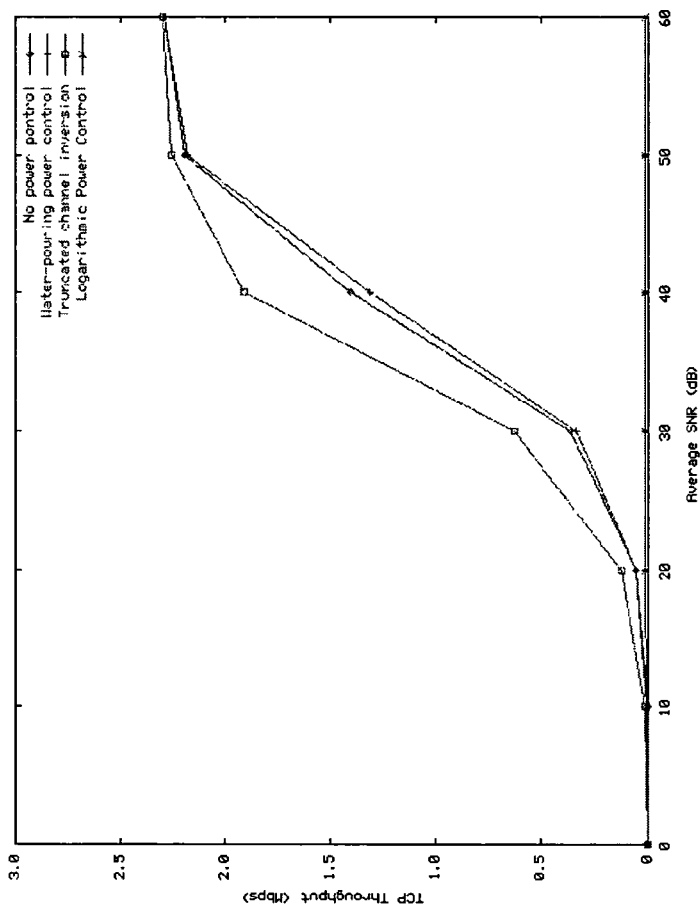
FIG. 2B shows TCP throughput as a function of signal-to-noise ratios (SNRs) for different power control measures under fast packet-transmission duration fading conditions.

FIG. 2B shows the TCP throughput as a function of signal-to-noise ratios (SNRs) for different power control/adaptation measures under fast packet transmission duration fading conditions where the fade level is assumed to be constant over the packet transmission interval. From FIG. 2B, under fast fading conditions, suitable power adaptation may provide improvements in the TCP throughput than without any power control/ adaptation measures. The power control measure of truncated channel inversion displays the best or improved adaptation to fading conditions and provides highest (or at least improved) throughput for all signal-to-noise ratios (SNRs). Logarithmic power control displays the least merit under fast fading conditions.

Figure 2C:
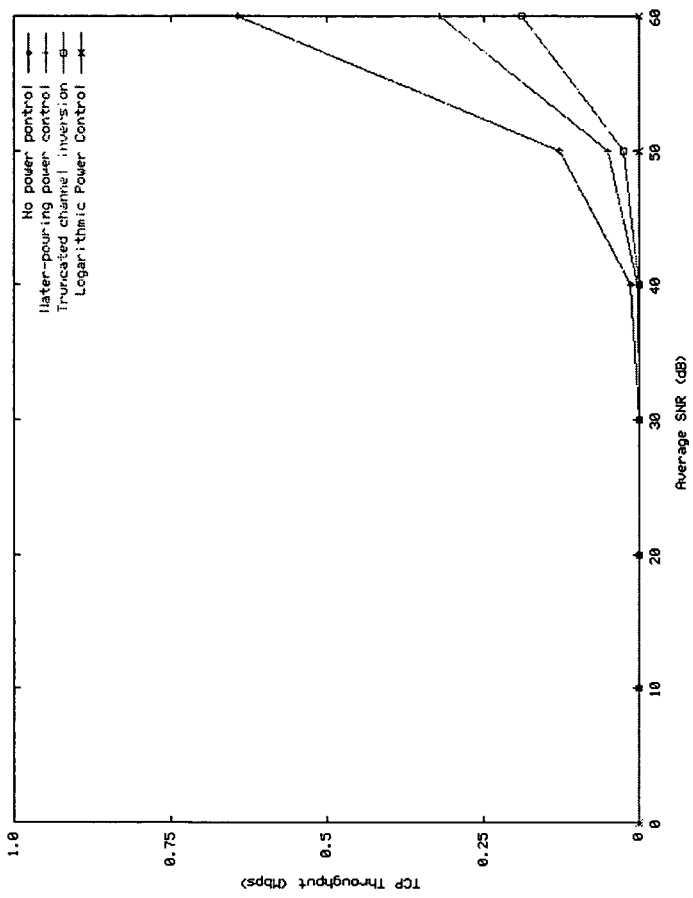
FIG. 2C shows TCP throughput as a function of signal-to-noise ratios (SNRs) for different power control measures under fast bit transmission duration fading conditions.

FIG. 2C shows the TCP throughput as a function of signal-to-noise ratios (SNRs) for different power control/adaptation measures under fast bit transmission duration fading conditions where the fade level is assumed to be constant over the bit transmission level. From FIG. 2C, under fast bit transmission fading conditions, power control/adaptation measures may not provide the same benefit to TCP throughput performance as under slow fading and fast packet transmission fading conditions.

TCP Performance when Path Loss and Fading are Compensated

The performance for TCP throughput with path loss and fading compensation measures is as follows:

At a given time t, $S(\gamma,t)/\bar{S}(t)$ represents the power adaptation to counter fading as per the power control measures previously discussed, and $\bar{S}(t)/\bar{S}_m$ denotes the power control for the path loss compensation of equation (10), so that the combined fading and path loss compensation factor is as follows:

$S(\gamma,t)/\bar{S}_m$.

Figure 3:
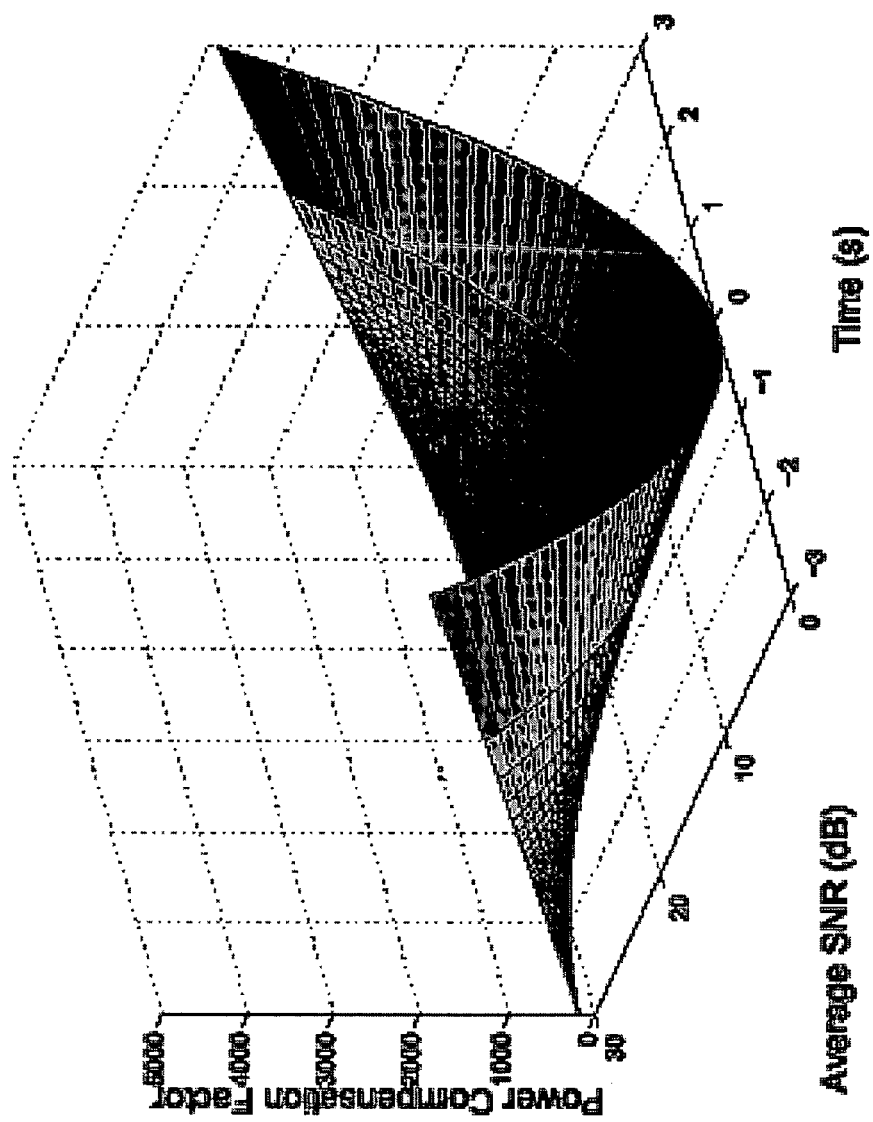
FIG. 3 shows a chart corresponding to fading and path loss compensation along a train trajectory.

FIG. 3 shows a combined path loss and fading compensation along a train trajectory. In particular, FIG. 3 shows the power compensation factor, as a function of time and signal-to-noise ratio (SNR), for mitigating both path loss and fading effects along a train trajectory (or other path). In the example, the train speed is 300 km/h and the coverage radius is 250 m for the AP/BS 102. The average channel SNR is 20 dB. At t=−3 s, the train gateway handoffs the AP/BS 102, becomes closest at t=0 s and incurs a handoff out of the AP/BS 102 coverage at t=3 s. The plot pattern would repeat as the train handoffs to next AP/BS 102. The system model to assess TCP throughput with different underlying power control measures is adopted. Fading is compensated according to the logarithmic power adaptation measures of equation (8) and the path loss is compensated according to equation (10).

At a given signal-to-noise ration (SNR), the power compensation factor increases with increasing distance from the AP/BS 102. As per logarithmic power adaptation, the power compensation factor increases for adverse channel conditions. With logarithmic power adaptation (the results of which are shown in FIG. 3), performance in FIG. 2B may be achieved irrespective of the location of train along the trajectory. It may however be difficult to have compensation of power by a large factor as 5000, because of practical and regulatory limitations. In that event, path loss compensation may be performed to a level as necessary to achieve desirable throughput.

The results may be used as a benchmark for placing wireless infrastructure along the train track. The trajectory track for a high-speed train (or other platform) may tend to be linear for safety considerations under high speeds. Once the trajectory track is known and modeled, the threshold of maximum acceptable power level that can be transmitted by the train may be used to determine the cell radius and the AP/BSs may be accordingly deployed along the track.

Figure 4:
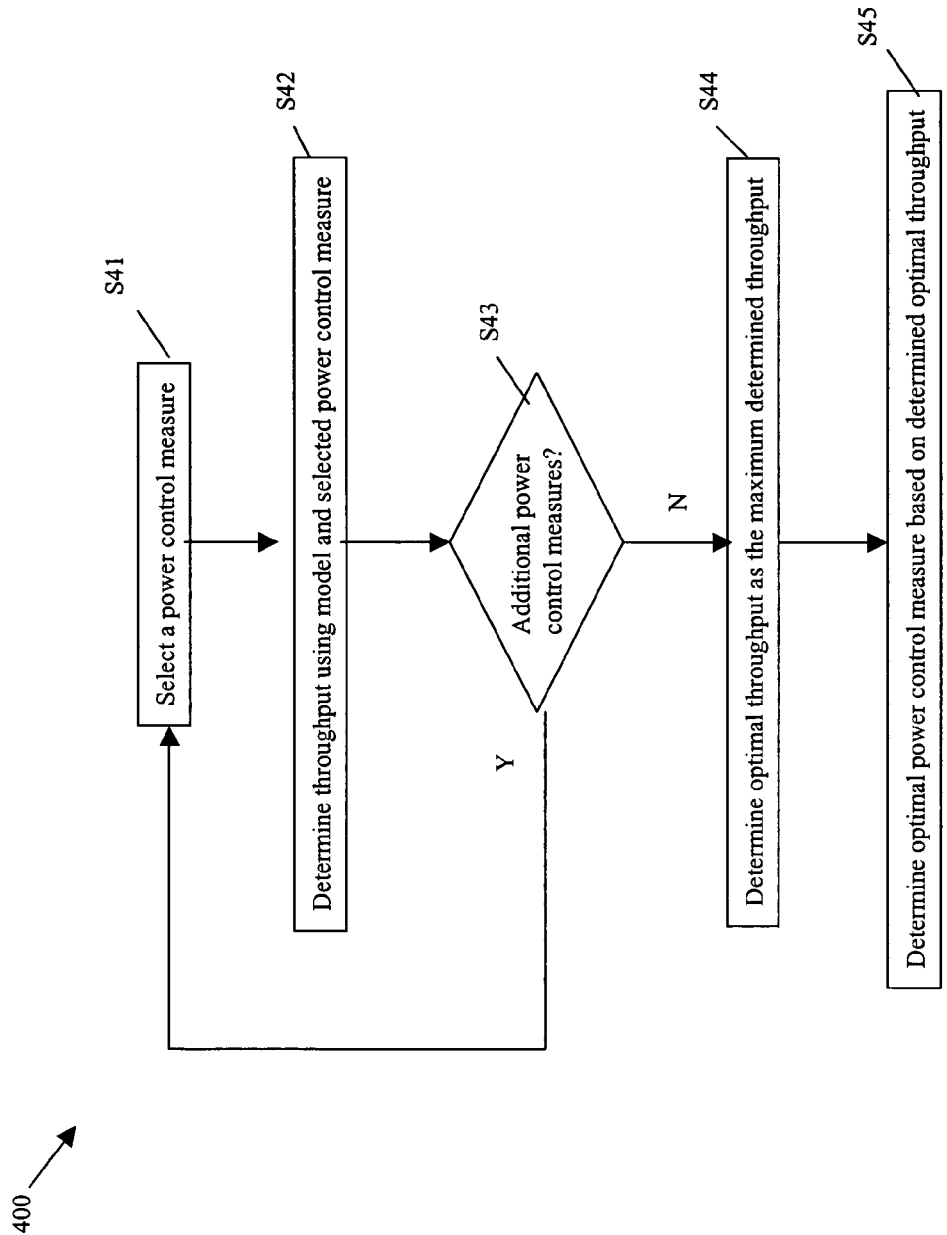
FIG. 4 shows an exemplary method to determine an optimal throughput and/or power control measure for a communications channel in a highly mobile wireless environment.

FIG. 4 shows an exemplary method 400 to determine an optimal throughput and/or power control measure for a communications channel in a highly mobile wireless environment. In step S41, a power control measure is selected from different control measures, which may include, for example, water-pouring, truncated channel inversion, and/or logarithmic power adaptation measures. Other control measures may also be used. In step S42, a throughput of the communications channel is determined using a throughput model based on a probability of packet error averaged over a packet fade, where the probability of packet error averaged over the packet fade is a function of the selected power control measure. In step S43, if it is determined that an additional power control measure is to be considered steps S41 and S42 are repeated. Otherwise, in step S44, an optimal throughput is determined as the maximum throughput determined from each of the selected power control measures. In step S45, an optimal power control measure is determined based on the determined optimal throughput. That is, the optimal power control measure is the one determined to have the maximum throughput.

Figure 5:
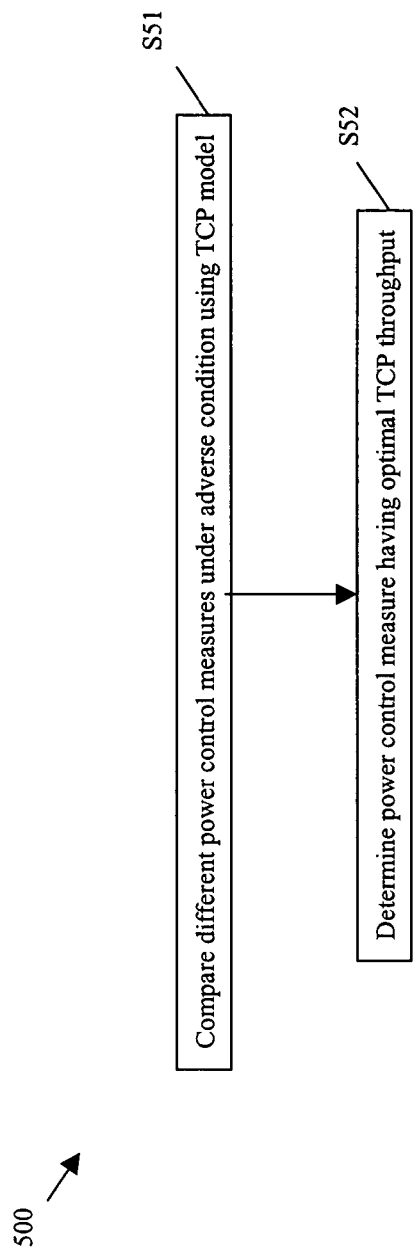
FIG. 5 shows an exemplary method to determine an optimal TCP throughput of a wireless communications channel between a stationary element and a mobile element.

FIG. 5 shows an exemplary method 500 to determine an optimal TCP throughput of a wireless communications channel between a stationary element and a mobile element. In step S51, different power control measures are compared under adverse conditions of the wireless communications channel using a model of TCP throughput of the wireless communications channel as a function of a probability of packet error averaged over a packet fade. In this regard, the adverse conditions may include, for example, slow fading, fast packet-transmission duration fading, and/or fast bit-transmission duration fading. The mobile element may be a gateway receiver/transmitter 101 (or other suitable communications system) traveling with a fast moving vehicle, such as, for example, a high-speed train 110, and fast moving with respect to the stationary element, which may be an access point and/or base station 102. In step S52, the power control measure providing the optimum throughput is then determined based on the maximum or optimal or best throughput.

Figure 6:
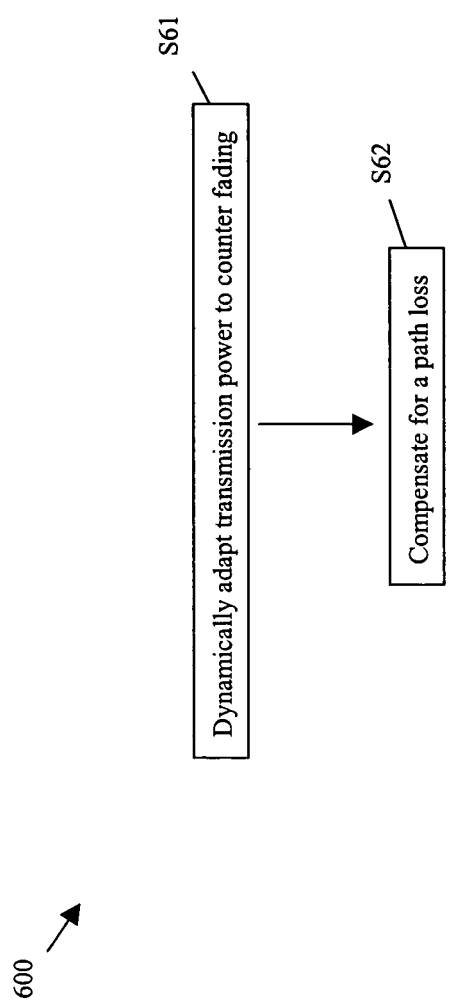
FIG. 6 shows an exemplary method to modify TCP throughput of a communications channel for a highly mobile wireless system.
Figure 8:
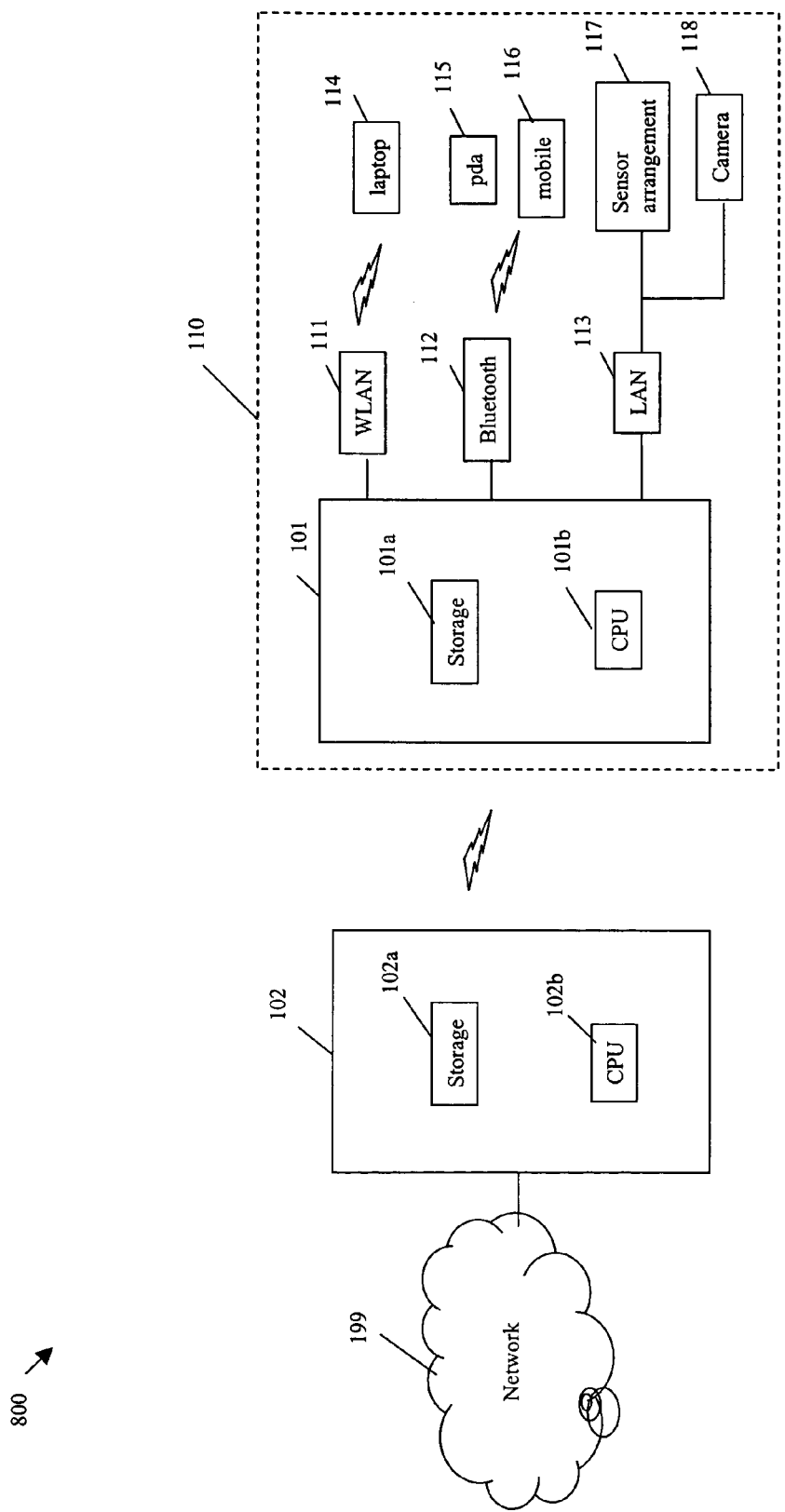
FIG. 8 shows an exemplary system 800 in which to perform the exemplary method of FIG. 6 at access point/base station 102 and/or mobile gateway 101.

FIG. 6 shows an exemplary method 600 to modify the TCP throughput of a communications channel for a highly mobile wireless system (such as, for example, the exemplary system of FIG. 8). In step S61, a transmission power of the wireless communications channel is dynamically adapted to counter fading using an implemented power control measure, which was selected based on a throughput model of the wireless communications channel that is a function of a probability of a packet error averaged over a packet fade, as explained above. In step S62, a path loss in the highly mobile system is compensated using a model corresponding to the path loss along the path, which is given, for example, by equation (10).

Figure 7:
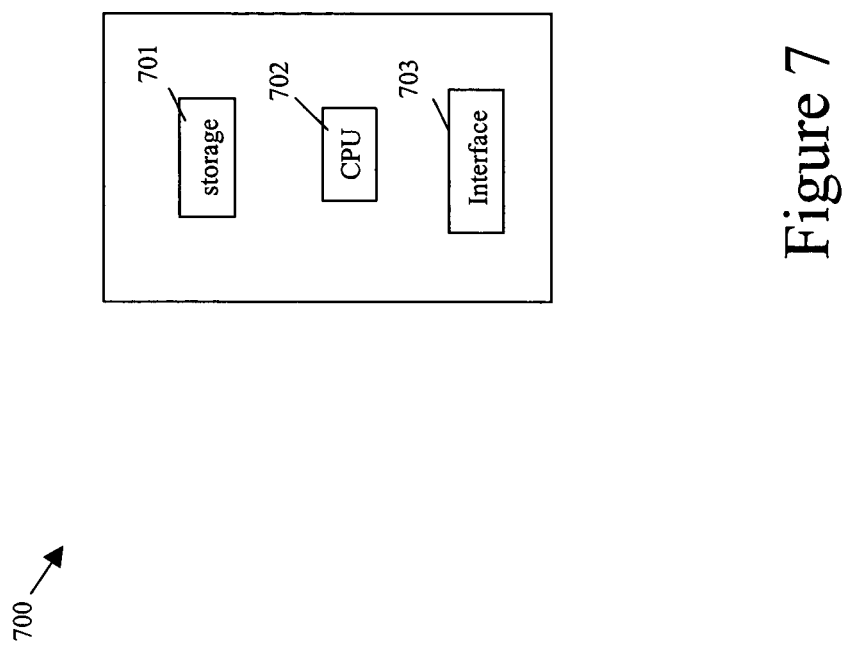
FIG. 7 shows an exemplary system 700 to perform the exemplary methods of FIGS. 4 and 5.

FIG. 7 shows an exemplary system 700 to perform the exemplary methods of FIGS. 4 and 5. The exemplary system 700 includes a storage arrangement 701, a processing arrangement 702, and a user/data interface 703. The storage arrangement 701 stores data related to a highly mobile wireless system, and instructions (e.g., program code) related to the exemplary method to determine an optimal throughput and/or optimal control power measure for the communications channel. The processing arrangement 702 processes the data, executes the instructions, and produces the throughput results. The user/data interface 701 inputs and outputs data and/or results. In this regard, the user/data interface 701 may include any suitable input and output arrangements, such as, for example, a keyboard, display screen, disk drive, communications port, etc.

An example embodiment includes a storage medium having a set of instructions residing therein, the set of instructions being executable by a processor to implement a method for performing: (a) selecting a power control measure; and (b) determining a throughput of the communications channel using a throughput model of the communications channel and the selected power control measure, wherein the throughput model is based on a probability of a packet error averaged over a packet fade, and wherein the probability of the packet error averaged over the packet fade is a function of the selected power control measure. In a further example embodiment, the method further includes: (c) repeating steps (a) and (b) for another power control measure; and (d) determining an optimal throughput as a maximum one of the throughputs determined for each of the selected power control measures.

FIG. 8 shows an exemplary system 800 to perform the exemplary method of FIG. 6. The exemplary system includes a gateway 101 associated with a high-speed train 110, which communicates with an access point/base station (AP/BS) 102, which communicates with a network 199. The gateway 101 and AP/BS 102 include, respectively, storage arrangements 101a and 102a, and processing arrangements 101b and 102b. The storage arrangements 101a and 101b store data related to the exemplary system 800, and instructions related to an exemplary method to modify throughput of a communications channel between the gateway 101 and the AP/BS 102. In this regard, the instructions may relate to one or more power control measures (which were selected based on a throughput model of the communications channel between the gateway 101 and the AP/BS 102) and/or to a path loss compensation model corresponding to a path loss along a trajectory path of the gateway 101. The instructions for providing the fading and/or path loss compensation are implemented, for example, as part of a communications protocol, in particular, a proprietary or Open Systems Interconnect (OSI) layer one or physical layer communications protocol responsible for managing the physical resources of the air interface between the gateway 101 and the AP/BS 102. The processing arrangements 101b and 102b process the data and execute the instructions. The high-speed train 110 includes the gateway 101, coupled to a WLAN arrangement 111, a Bluetooth arrangement 112 and a LAN arrangement 113, which may be in communicative contact with a laptop 114, a pda 115, a mobile telephone 116, a sensor arrangement 117, and/or a camera 118.

Figure 9:
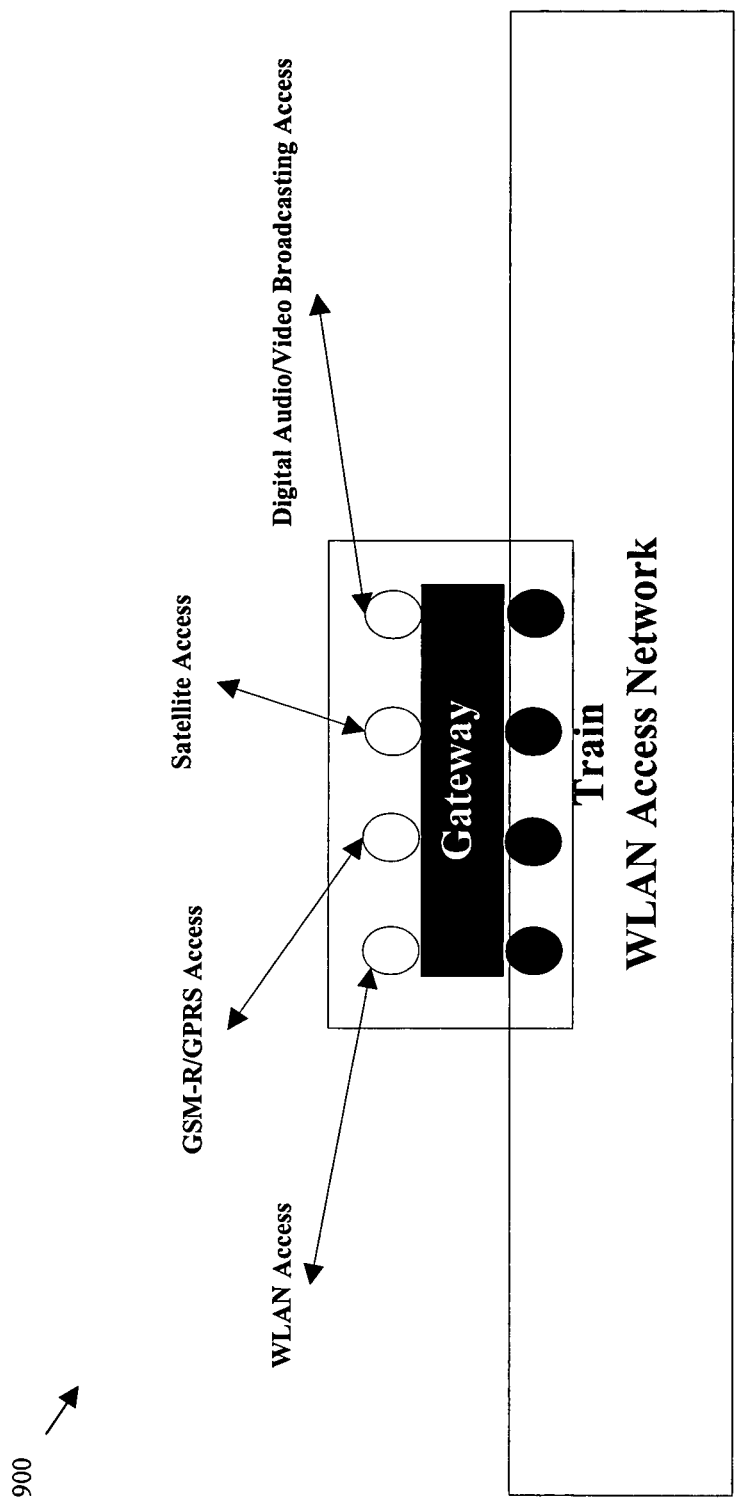
FIG. 9 shows exemplary communications protocols supported by the exemplary method of FIG. 6 and/or the exemplary system of FIG. 8.

FIG. 9 shows an exemplary communications protocols supported by the exemplary system of FIG. 8. In particular, the communications protocol may include, for example, GSM (Global System for Mobile Communications), GPRS (General Packet Radio Service), UMTS (Universal Mobile Telecommunications System), WLAN (Wireless Local Area Network), Satellite access, and Digital Audio/Video Broadcasting access.

What is claimed is:

1. A method for determining an optimal throughput of a communications channel in a highly mobile wireless environment, the method comprising:
   (a) selecting a power control measure;
   (b) determining a throughput of the communications channel using a throughput model of the communications channel and the selected power control measure, wherein the throughput model is based on a probability of a packet error averaged over a packet fade, and wherein the probability of the packet error averaged over the packet fade is a function of the selected power control measure; and
   (c) repeating steps (a) and (b) for another power control measure; and
   (d) determining the optimal throughput as a maximum one of the throughputs determined for each of the selected power control measures, wherein the throughput model is:

$$B_{pf} = \begin{cases} \dfrac{\dfrac{1-\bar{p}}{\bar{p}} + E[W] + \hat{Q}(E[W])\dfrac{1}{1-\bar{p}}}{RTT\left(\dfrac{b}{2}E[W_u]+1\right) + \hat{Q}(E[W])T_0\dfrac{f(\bar{p})}{1-\bar{p}}}, & \text{if } E[W_u] < W_{max} \\ \dfrac{\dfrac{1-\bar{p}}{\bar{p}} + W_{max} + \hat{Q}(W_{max})\dfrac{1}{1-\bar{p}}}{RTT\left(\dfrac{b}{8}W_{max} + \dfrac{1-\bar{p}}{\bar{p}W_{max}} + 2\right) + \hat{Q}(W_{max})T_0\dfrac{f(\bar{p})}{1-\bar{p}}}, & \text{otherwise,} \end{cases} \quad (2)$$

wherein W is the random variable representing TCP window size, $T_0$ the timeout, $W_{max}$ is the maximum window size, b represents the number of packets that are acknowledged by a received ACK and $W_u$ is the unconstrained window size, $\hat{Q}(w)$ represents the probability that a loss in a window of size w is a timeout (TO), and $\bar{p}$ is the probability of packet error averaged over the packet fade.

2. The method of claim 1, wherein the probability of packet error averaged over the packet fade is:

$$\bar{p} = \int_\gamma p\left(\gamma \frac{S(\gamma)}{\bar{S}}\right) f_\gamma(\gamma) d\gamma. \tag{15}$$

3. The method of claim 1, wherein the selected power control measures include a water-pouring adaptation measure.

4. A method for determining an optimal power control measure for a communications channel in a highly mobile wireless environment, the method comprising:
(a) selecting a power control measure;
(b) determining a throughput of the communications channel using a throughput model of the communications channel and the selected power control measure, wherein the throughput model is based on a probability of a packet error averaged over a packet fade, and wherein the probability of the packet error averaged over the packet fade is a function of the selected power control measure;
(c) repeating steps (a) and (b) for another power control measure;
(d) determining the optimal throughput as a maximum one of the throughputs determined for each of the selected power control measures; and
(e) determining the optimal power control measure based on the determined optimal throughput.

5. A method of determining an optimal TCP throughput of a wireless communications channel between a stationary element and a mobile element, the method comprising:
comparing different power control measures under an adverse condition of the wireless communications channel using a model of TCP throughput of the wireless communications channel as a function of a probability of packet error averaged over a packet fade; and
determining a power control measure to provide an optimum TCP throughput.

6. The method of claim 5, wherein the adverse condition includes fading.

7. The method of claim 5, wherein the adverse condition includes slow fading.

8. The method of claim 5, wherein the adverse condition includes fast packet-transmission duration fading.

9. The method of claim 5, wherein the adverse condition includes fast bit-transmission duration fading.

10. The method of claim 5, wherein the mobile element is fast moving with respect to the stationary element.

11. The method of claim 5, wherein the mobile element is a gateway communications arrangement traveling with a fast moving vehicle.

12. The method of claim 11, wherein the fast moving vehicle is a high-speed train.

13. The method of claim 5, wherein the stationary element is at least one of an access point and a base station.

14. A method of modifying a TCP throughput of a wireless communications channel in a highly mobile system, the method comprising:
dynamically adapting a transmission power of the wireless communications channel to counter fading using a power control measure, which was selected based on a throughput model of the wireless communications channel that is a function of a probability of a packet error averaged over a packet fade.

15. The method of claim 14, further comprising:
compensating for a path loss in the highly mobile system using a model corresponding to the path loss along the path.

16. The method of claim 15, wherein the model corresponding to the path loss along the path is:

$$\bar{S}(t) = \bar{S}_m\left(1 + \left(\frac{vt}{d_0}\right)^2\right)^{\frac{\delta}{2}} \tag{10}$$

where $\delta$ is the path loss exponent for a train-track environment, $\bar{S}(t)$ is the average power for a fast packet transmission fading, $d_0$ is the distance between stationary and mobile elements of the wireless communication channel at time 0, v is the velocity of the mobile element, and $\bar{S}_m$ is the average power at time 0.

17. The method of claim 15, further comprising:
a second compensation arrangement to compensate for a path loss in the highly mobile wireless communications system using a model corresponding to the path loss along the path.

18. A highly mobile wireless communications system, comprising:
a first compensation arrangement to compensate a transmission power of a communications channel to counter fading using a power control measure, which was selected based on a throughput model of the wireless communications channel that is a function of a probability of a packet error averaged over a packet fade.

19. A method for determining a throughput of a communications channel in a highly mobile wireless environment, the method comprising:
(a) selecting a power control measure; and
(b) determining the throughput of the communications channel using a throughput model of the communications channel and the selected power control measure, wherein the throughput model is based on a probability of a packet error averaged over a packet fade, and wherein the probability of the packet error averaged over the packet fade is a function of the selected power control measure.

20. A system comprising:
a storage medium having a set of instructions residing therein, the set of instructions being executable by a processor to implement a method for:
(a) selecting a power control measure; and
(b) determining a throughput of the communications channel using a throughput model of the communications channel and the selected power control measure, wherein the throughput model is based on a probability of a packet error averaged over a packet fade, and wherein the probability of the packet error averaged over the packet fade is a function of the selected power control measure.

21. The system of claim 20, wherein the method further includes:
(c) repeating steps (a) and (b) for another power control measure; and (d) determining an optimal throughput as a maximum one of the throughputs determined for each of the selected power control measures.

22. The method of claim 4, wherein the probability of packet error averaged over the packet fade is:

$$\bar{p} = \int_\gamma p\left(\gamma \frac{S(\gamma)}{S}\right) f_\gamma(\gamma) d\gamma. \quad (15)$$

23. The method of claim 4, wherein the selected power control measures include a water-pouring adaptation measure.

* * * * *